United States Patent [19]
Harper et al.

[11] Patent Number: 6,025,679
[45] Date of Patent: Feb. 15, 2000

[54] LIGHTING SPACE CONTROLLER

[75] Inventors: Raymond G. Harper, 2502 Wildhorse Dr., San Ramon, Calif. 94583; Gregory T. Kavounas, Beaverton, Oreg.

[73] Assignee: Raymond G. Harper, San Ramon, Calif.

[21] Appl. No.: 09/074,168

[22] Filed: May 6, 1998

[51] Int. Cl.$^7$ .................................................. H05B 37/00
[52] U.S. Cl. ......................... 315/312; 315/224; 315/308; 315/155; 250/214 AL; 364/165
[58] Field of Search ..................... 315/312, 294, 315/295, 308, 361, 155, 158, 159, 224, 307; 250/214 AL, 204, 205; 364/165, 150, 157, 148

[56] References Cited

U.S. PATENT DOCUMENTS

| | | | |
|---|---|---|---|
| 4,234,820 | 11/1980 | Widmayer | 315/152 |
| 4,236,101 | 11/1980 | Luchaco | 315/158 |
| 5,668,446 | 9/1997 | Baker | 315/294 |
| 5,701,058 | 12/1997 | Roth | 315/158 |

OTHER PUBLICATIONS

Electric Power Research Institute, "Photoelectric Control of Daylight–Following Lighting Systems, Daylight–Sensing Photocell Placement", Report No. EPRI CU–6243, Research Project 2285–3 Final Report, Mar. 1989, prepared by Lawrence Berkeley Laboratory, pp. iii to 10–1.

Pacific Gas & Electric, Research and Development, Automatic Lighting Controls Demonstration: Long–term Results, Customer Systems Report 008.1–91.21, pp. ii to A–2.

*Primary Examiner*—Haissa Philogene
*Attorney, Agent, or Firm*—George T. Kavounas; Edward B. Anderson

[57] ABSTRACT

An illumination control system uses two photocells, one directed toward an illuminated lamp and the other directed from the ceiling downwardly into the illuminated zone. A feedback signal is derived from the two photocell signals and a reference intercept signal. The feedback signal and a reference set point signal are input into an error amplifier. The error amplifier generates a control signal for setting the illumination in controlled lamps. The photocell signals are variously scaled to provide balancing between them and matching with the intercept signal. Scaling factors and intercept signal level arc set in a calibration procedure that establishes feedback circuit response consistent with a design set point transfer function.

22 Claims, 8 Drawing Sheets

LIGHTING SPACE CONTROLLER

BACKGROUND OF THE INVENTION

1. Field of the Invention

The present invention relates to the field of systems for controlling illumination levels in illuminated spaces, such as inside buildings.

2. Description of Related Art

Most buildings consume considerable amounts of energy for illumination. Lighting control systems have been developed in an attempt to provide sufficient illumination levels while avoiding unnecessary energy consumption. These systems include controls to schedule periods of illumination, tune lamp brightness, respond to associated daylight levels by adjusting lamp output and maintaining illumination as lamps degrade. These strategies are commonly referred to as Scheduling, Tuning, Daylighting and Lumen Maintenance, respectively.

A report, prepared by Lawrence Berkeley laboratory (LBL), was published by the Electric Power Research Institute (EPRI) CU-6243 Research Project 2285-3 in March of 1989. This report recognized problems related to photocell placement to monitor and control the illumination levels in buildings. The EPRI report identified that the only practical location for a control photocell is at ceiling level. This location is not where one would logically monitor the illumination since maintaining the illumination on working surfaces is a desired objective. The relative illuminations at normal desk height and at the ceiling level vary considerably when daylight is replaced by ceiling mounted electric lighting. The reason for this variance is that daylight tends to illuminate areas from the side (windows on walls) and thus illuminates ceiling and desk areas at similar levels. On the other hand, ceiling mounted artificial lighting shines down onto desk areas and only reflected light reaches the ceiling areas.

LBL suggested various empirical algorithms to overcome the worst of these effects. These involved custom analysis of each area and did not allow the Lumen maintenance and daylighting strategies to be implemented in a single system.

In 1991 Pacific Gas and Electric Company (PG&E) published a Customer Systems Report 008.1-91.21 on an evaluation project monitored by LBL. This technology is owned by and was installed under the guidance of Raymond G. Harper, the primary inventor of the present invention. The project demonstrated that all of the strategies could be implemented by a single control system. There remained a major problem in that the calibration procedure required high skill levels, was very complex and time consuming. It also had to be calibrated when daylight levels were stable and within a fairly small range.

The basis for the work, which was the subject of the PC&E report, was to use two photocells, together comprising a sensor system to separately monitor total illumination and predominantly artificially generated illumination (from the controlled light source). Signals from these two separate sensors were mixed in critical proportions determined by placement of the photocells, to produce the sensor system output. The structure and method of calibrating the 1991 sensor system is described with the aid of FIGS. 1–4.

FIG. 1 shows a two photocell system 46 where a first sensor 54 receives light flux from the area directly below system 46 and a second sensor 56 receives light flux from an area above system 46. Sensors 54 and 56 are operated in a current signal mode and parallel connected such that the two currents sum into a common signal. By feeding the current through a variable resistor a signal voltage can be generated and scaled to be of a desired level.

FIG. 2 shows sensor system 46 mounted close to a light fixture 42 such that second sensor 56 receives an amount of light flux from the fixture 42 which amount can be varied by adjusting the vertical position of sensor system 46. This adjustment could also be achieved by rotation of sensor system 46.

The sensitivity to changes in daylight flux of sensors 54 and 56 is not critically altered by adjusting the vertical position of system 46 but the sensitivity of sensor 56 to changes in illumination from fixture 42 flux is critically varied. FIG. 3 illustrates generally the gain of sensor system 46 after calibration. Horizontal axis 30 corresponds to the detected illumination, while vertical axis 32 corresponds to the resulting output voltage. The slope of line 38 is the gain response of sensor system 46.

To calibrate an illumination system incorporating a sensor system 46,

- the fixture lamps are turned OFF;
- the (daylight) illumination at desk height is measured (in a reference location);
- the variable scaling resistor is adjusted to attain the desired signal level;
- the fixture lamps are turned ON;
- the (total) illumination at the same reference location is measured; and
- the vertical position of sensor system 46 is adjusted until the desired signal level is once more achieved.

FIG. 4 shows the signal from sensor system 46 input into a zone controller 48 which compares the sensor signal (actual illumination) with an illumination set point generated by an Energy Management System (EMS) 52 located at a remote location 50. The zone controller generates a lamp current signal to control the fixture(s) 42 illuminating from a ceiling 44 the lighting zone being controlled. A lighting space or zone, represented by area 40, is an area, usually of a building, controlled separately from surrounding areas.

This system, while effective for maintaining illumination levels at desired set points, requires skilled and costly labor, as well as significant time to calibrate. If a building has numerous lighting zones, the time and cost are substantial.

SUMMARY OF THE INVENTION

Generally, the present invention provides a closed loop controlled space lighting system that maintains the illumination in a first or reference location, such as a desk surface, in the space at a selected set point level. The system uses two illumination sensors, such as photocells, to monitor the illumination of the space. The first sensor is attached at a second location, such as at the ceiling and aimed downwards. The second sensor is located at a third location, such as within a ceiling-mounted light fixture, of the space. A zone controller circuit receives inputs from the sensors, and in turn adjusts the output of the controlled light fixtures. The zone controller circuit accomplishes this by creating an appropriate control signal, and feeding it to one or more lamp drivers, such as controllable ballasts or other devices, which modulate lamp power.

The control-signal-to-output transfer function is assumed to be monotonic and nominally linear. It may be of either polarity and may produce a full output or a non-zero minimum output at zero signal. The preferred lamp driver is controlled by a single input which provides the ability to turn the lamps ON/OFF and to modulate the power to vary the output of the controlled lamps. It is preferred that the lamp driver circuit also include an independent gain control to allow tuning of the illumination profile throughout the area of a zone. A linearly increasing or decreasing set point function is selected depending on whether the output from the lamps increases or decreases with the value of the control signal.

The function of the feedback circuit is to convert the photosensor signals into a linear analog signal relative to the illumination experienced at the first (reference) location. This assumes that the set point generation is also linear. The feedback circuit includes a first signal scaling means for scaling at least a first one of the illumination signals. A signal addition means sums the illumination signals. The design of the feedback circuit is subject to various embodiments that match the feedback signal to the set point function.

In one embodiment of the invention, the feedback circuit produces a composite signal by adding the signals of the two sensors, after it has scaled one of them by an adjustable gain factor. It is set at a value that balances the signal contributions between the controlled lighting and the uncontrolled lighting. The composite signal accordingly increases linearly with illumination.

The feedback circuit also includes a second signal scaling means that multiplies the composite signal by a second adjustable gain factor to produce the desired feedback signal.

In another embodiment of the invention, the feedback circuit also includes an intercept signal generator and a signal subtraction means. The signal generator outputs an intercept signal whose value is adjustable. The subtraction means subtracts the scaled composite signal from the intercept signal. Thus, it produces a feedback signal suitable for use with linearly decreasing set point functions. A matching calibration process sets simultaneously the values of the second gain factor and the intercept signal.

In yet another embodiment of the invention, the first signal scaling means multiplies the signal of one sensor by a first gain factor, and the second signal scaling means multiplies the signal of the other sensor by a second gain factor. The scaled signals are added, and then subtracted from the intercept signal. Further, a single hybrid calibration process is performed that accomplishes both balancing and matching. The hybrid calibration process sets simultaneously the values of the first factor, the second factor, and the intercept signal.

In addition, the preferred zone controller circuit includes an automated calibration circuit. When authorized and prompted, the calibration circuit receives inputs from a photometer, overrides the normal feedback operation of the signal formation circuit, and executes an automated calibration procedure that sets each of the adjustable parameters of the feedback circuit.

These and other features of the present invention will be apparent from the preferred embodiments described in the following detailed description and illustrated in the accompanying drawings.

DETAILED DESCRIPTION OF THE PREFERRED EMBODIMENTS

As has been mentioned, the invention provides a closed loop controlled space lighting system. The system holds the illumination at a predefined level, that is also known as the illumination set point, so long as any uncontrolled illumination in the space does not exceed the illumination set point.

Figure 5:
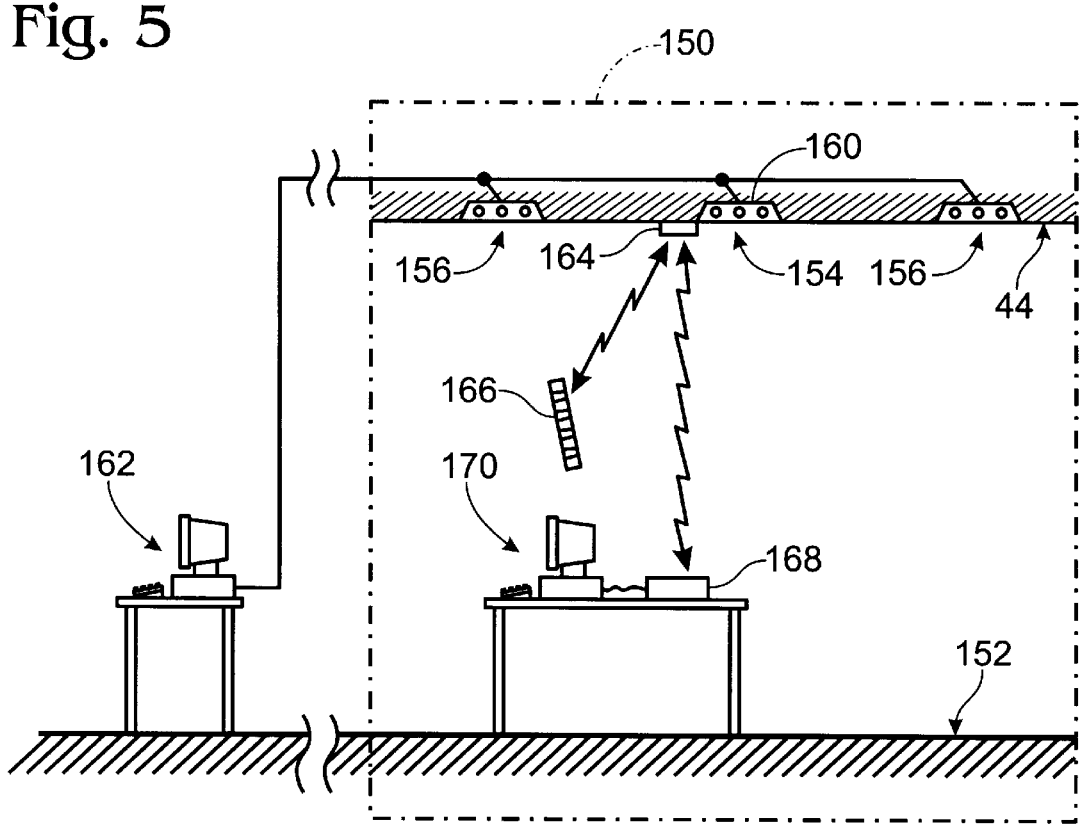
FIG. 5 illustrates components of a system of the invention for controlling the illumination in a zone of an existing building.

As seen in FIG. 5, the system of the invention can be applied to a building lighting zone 150 of a building with a floor 152 and a ceiling 44. Preferably a zone is selected such that every part of it is used for similar activities, and is exposed to common ambient lighting. This usually means that every part of the zone has similar exposure to and distance from similarly oriented windows. The zone includes ceiling mounted light fixtures 154, 156, also known as light fixture means. A light fixture 154, preferably selected to be near the most important area of the zone, is designated as the master fixture. The remaining light fixtures 156 are designated as the slave fixtures. Each light fixture contains lamps, also known as lamp means. Each lamp is controlled by a special power supply circuit called a lamp driver (not shown in FIG. 5), and a lamp driver preferably controls a plurality of lamps.

The invention includes a zone controller circuit 160, that is also known simply as a zone controller. The zone controller is preferably provided in a suitable location, such as in the master fixture. The zone controller is connected to all of the lamp drivers in the zone, and thus controls the amount of illumination provided by the associated lamps.

The system of the invention may be part of an illumination control system for multiple zones, with central control included in an Energy Management System (EMS) 162.

EMS 162 can be implemented by a personal computer that can be located anywhere in the building. The EMS is connected to the zone controller by suitable wiring, e.g. by modular telephone cables. In such a system, an operator inputs into the EMS zone parameter information, such as the desired illumination set point of each zone. Alternately, the information can be input into the EMS automatically, as part of the calibration process described below. The EMS controls the zone controller accordingly. In addition, the EMS can receive data from the zone controller about energy usage, lamp currents, etc., and further compile statistics on the data.

In the preferred embodiment, the invention includes a communications module 164, preferably mounted near the master fixture, which typically is recessed in the ceiling or supported below the ceiling. The communications module is connected to the zone controller by wiring such as modular telephone cables. Module 164 can incorporate components of the system that need a direct line of sight to the space below. For example, it can incorporate a photocell, an occupancy sensor, etc. The occupancy sensor can inform the zone controller or the EMS system of the occupancy levels in the zone, and adjust the illumination set point accordingly.

Importantly, module 164 contains a first infrared (IR) data link transceiver, which is why it is also called a communications module. This enables wireless communication of the zone controller with other components of the system of the invention. A hand held, manually operated local controller 166 contains an IR data link transmitter for transmission of signals to module 164. The local controller is used to override the EMS generated illumination set point.

The system preferably further includes a portable calibration unit 168 which is positioned as shown in FIG. 5 at a representative desk or other illuminated location also referred to as a first location, for calibration of the system in zone 150. Unit 168 contains a photometer (also referred to as a third illumination sensor) and an IR data link transceiver for communication with module 164, and thus also with the zone controller. Calibration unit 168 is preferably supported by a laptop or other conventional personal computer 170 via a serial cable.

Figure 6:
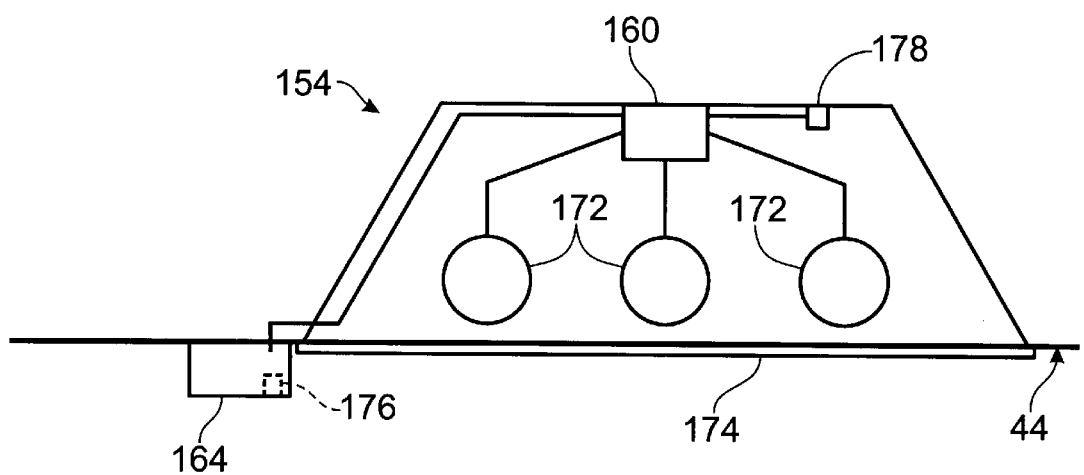
FIG. 6 illustrates a detail of a master fixture of FIG. 5.

FIG. 6 illustrates in more detail master fixture 154 of FIG. 5. The fixture includes lamps 172 and a translucent cover 174 that is flush with ceiling 44.

The translucent cover is unimportant and the fixture need not be flush with the ceiling. For instance, indirect lighting fixtures are supported below the ceiling and project light flux upwards onto the ceiling to be reflected down into the working area. This reduces the brightness contrast ratios as one looks at the ceiling.

Figure 1:
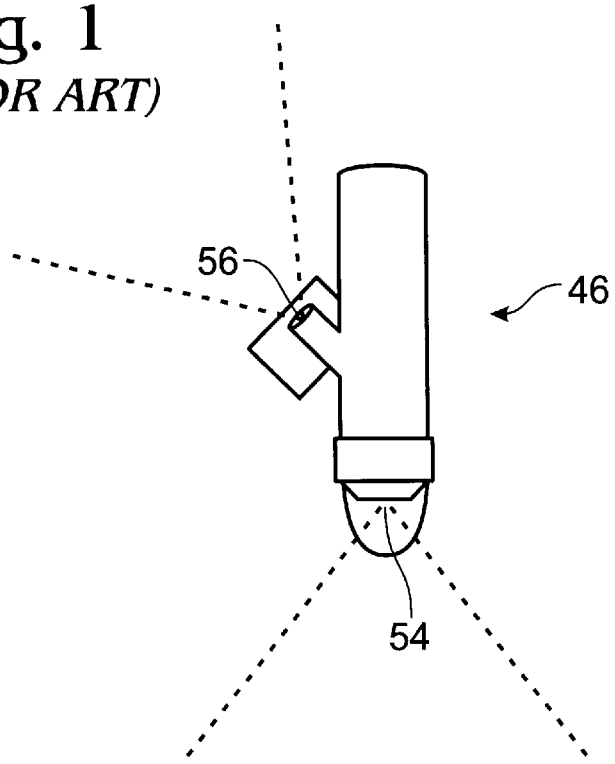
FIG. 1 illustrates a sensor system with two photocells used in the prior art.
Figure 2:
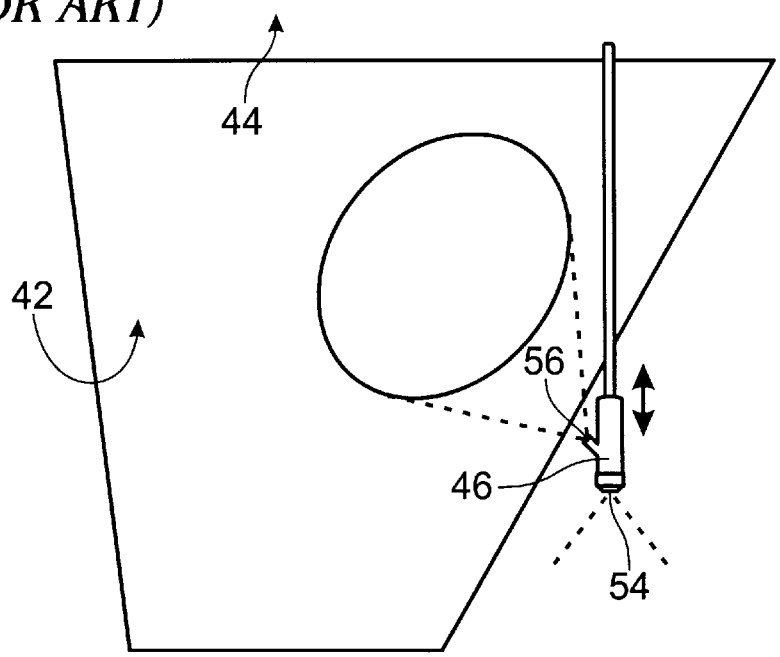
FIG. 2 illustrates the conventional placement of the sensor system of FIG. 1 relative to a light fixture.
Figure 3:
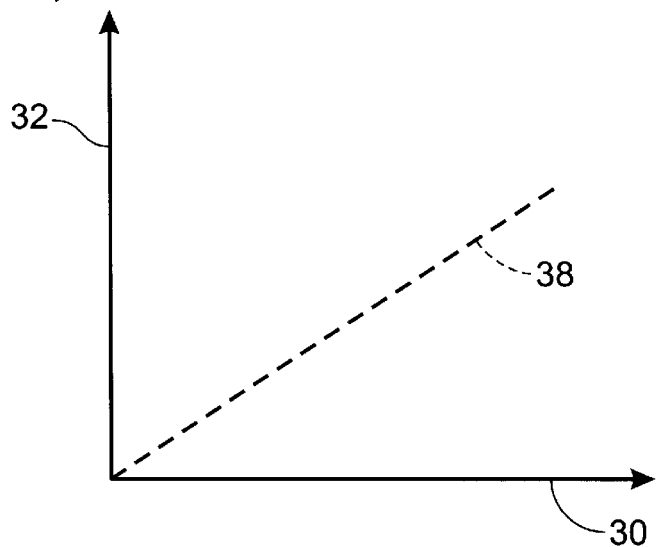
FIG. 3 is a diagram showing the idealized response characteristic of a conventional photocell.
Figure 4:
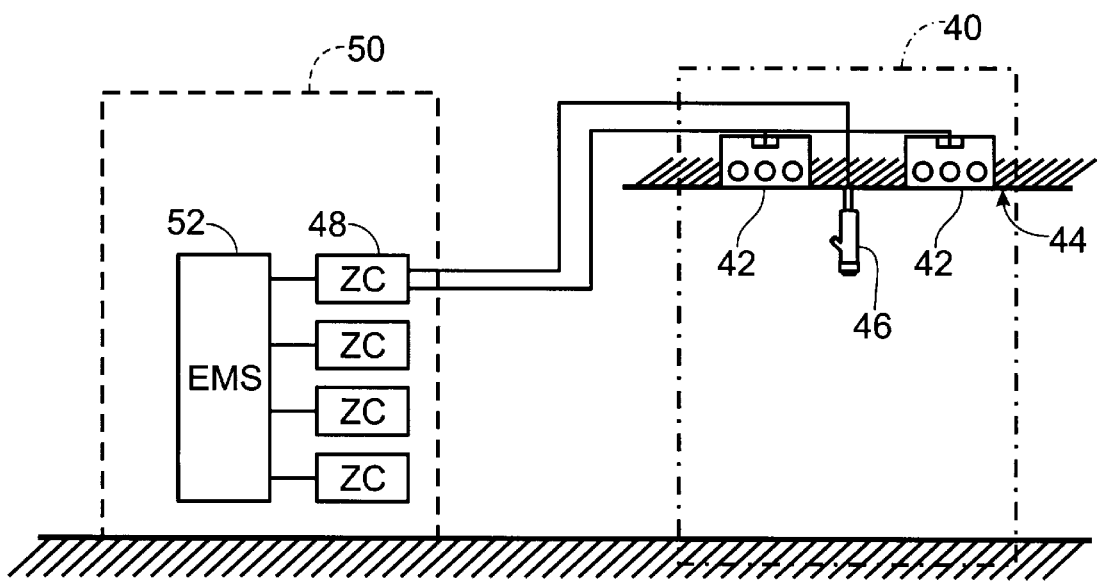
FIG. 4 illustrates a prior art lighting control system using the sensor system of FIG. 1.

The system also includes two photocells, also referred to as illumination sensors, associated with the master fixture. The two photocells are numbered first and second only for purposes of differentiating between them. The photocells preferably have a response characteristic similar to that of the human eye. A good candidate is unit BPW21 made by Siemens, which is operated in the photoconduction mode with a nominal 5 V reverse bias. This causes it to exhibit the idealized response characteristics of FIG. 3.

The photocells are located and oriented such that they sample the illumination present at different locations. The locations are chosen such that one receives illumination from the zone, and the other receives illumination predominantly from controlled lamps. Accordingly, a first photocell 176 is attached to ceiling 44 and aimed downwards. As such, the first photocell samples a combination of controlled and uncontrolled lighting, and produces an associated first photocell signal. In the preferred embodiment, the first photocell is conveniently incorporated in communication module 164.

A second photocell 178, is preferably located in the interior of the master fixture. The second photocell therefore predominantly samples controlled electric lighting, and produces an associated second photocell signal.

Additional photocells may also be used in the zone. This is especially desirable where a zone is large, or subject to diverse activities at different parts of it, or just shaped irregularly. The signals from the additional photocells are then combined with those of the first and second photocells. Specifically, it is preferred that the additional photocells are provided in pairs, each pair being associated with a slave light fixture.

Figure 7:
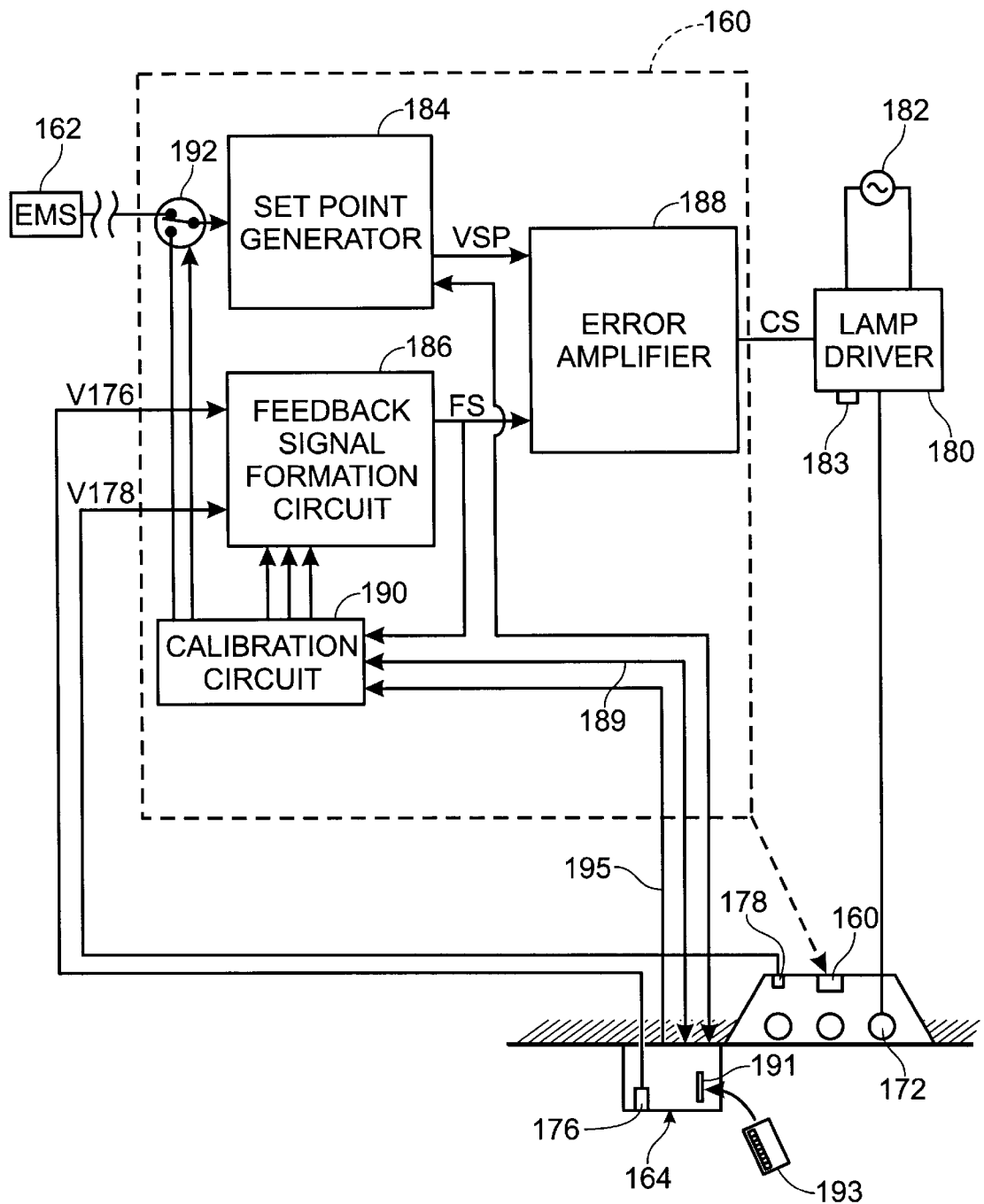
FIG. 7 is a block diagram illustrating the feedback operation of the system of the invention.

The steady state operation of the system of the invention is now described with reference to FIG. 7. The circuit of zone controller 160 is shown outside of its physical location in the lamp fixture for clarity. The zone controller receives continuously signals $V_{176}$ and $V_{178}$ from photocells 176 and 178 respectively, and outputs a control signal CS.

As mentioned above, each lamp 172 is driven by a lamp driver 180. Preferably a lamp driver drives all of the lamps in a fixture. Although the lamp driver is physically located close to the lamp, in FIG. 7 it is shown removed for clarity, lamp driver 180 receives power from building line power 182. The output of lamp driver 180 is preferably manually controllable with an adjustment knob 183. The lamp driver also receives control signal CS and, in response to the control signal, adjusts the amount of illumination provided by the lamp, according to its specified transfer function. A lamp driver is preferably selected such that its transfer function provides nonzero illumination for zero control signal CS. This way, if the power to the zone controller is ever interrupted and control signal CS becomes zero, the lamps will remain on, not off.

The system of the invention works where the transfer function of the lamp driver varies monotonically with the magnitude and polarity of control signal CS. As long as it is monotonic, the transfer function need not be linear, because the feedback via the highly linear photosensor system defines a linear total system.

A set point generator 184 produces an output voltage $V_{SP}$ defined by signals from the EMS, local controller and occupancy sensors via, in the preferred embodiment, a microcomputer in the zone controller. This microcomputer provides time delays, slew rates and illumination levels, according to algorithms preloaded from the EMS.

Zone controller 160 also includes a feedback signal formation circuit 186, also referred to simply as a feedback circuit. Circuit 186 receives the photocell signals. Feedback circuit 186 creates a single feedback signal FS from the combined photocell signals. Circuit 186, when calibrated according to the calibration process described below, makes the feedback signal behave according to a designed set point function.

Zone controller 160 further includes an error amplifier 188, also referred to as an error amplifier means. Amplifier 188 has two inputs, one connected to circuit 186 and another connected to set point generator 184. Amplifier 188 outputs control signal CS.

During the normal operation, set point generator 184 is controlled by EMS 162 to generate a specific set point voltage. Error amplifier 188 compares the existing value of signal FS with the set point voltage $V_{SP}$ and adjusts its output signal CS according to the polarity and amplitude of the difference. This output forces the lamp driver power to adjust the illumination, bringing signal FS into balance with voltage $V_{SP}$. Accordingly, the EMS controls the illumination of the zone by controlling the value of the set point voltage.

Zone controller 160 also preferably includes a calibration circuit 190. Circuit 190 is adapted to sense the feedback signal, and to receive inputs from the photometer in calibration unit 168. In the preferred embodiment, circuit 190 is connected to transceiver 164 for receiving commands that prompt calibration, and exchange calibration information that includes the photometer inputs.

It is additionally preferred that module 164 have a slot for receiving a coded key card, referred to generally as a key, during calibration. When the key card is inserted in the slot, the calibration circuit operates switch 192 so that set point generator 184 receives an input signal from the calibration circuit rather than from EMS 162.

The calibration procedure preferably does not involve the EMS. A non volatile memory in the zone controller allows an operating program to be permanently stored within the zone controller via the personal computer 170 during the calibration process. The calibration process is prompted through the personal computer and executed automatically. When prompted, circuit 190 takes control of generator 184 and accordingly controls the zone illumination. Circuit 190 then calibrates the adjustable parameters of feedback signal formation circuit 186. As is described later, calibration is performed by switching the lamp power, ideally between full power and off, adjusting parameters in the feedback signal formation circuit, and sensing the effects of the adjustment on the feedback signal. The preferred topology for a lamp driver is one where full power is selected by removing the control signal from it. This is discussed further with reference to FIG. 15.

The calibration method of the invention includes two calibration processes. One is a balancing calibration process, where the relative contributions from the two photocells are balanced. The other is a matching process, where the feedback signal function is matched to the preselected set point function. The two processes can be performed separately or simultaneously, depending on the embodiment of the feedback signal formation circuit.

For the matching to be possible, the feedback signal formation circuit changes the feedback signal according to the preselected set point function.

A first embodiment of the feedback signal formation circuit, shown as reference numeral 206, is now described with reference to FIG. 8. Feedback signal formation circuit 206 is adapted to form a feedback signal FS1 that increases with illumination. Circuit 206 includes an input channel means 214. The input channel means senses the first photocell signal $V_{176}$ and the second photocell signal $V_{178}$.

A first signal scaling means 216 multiplies only one of the two signals $V_{176}$ and $V_{178}$ by a first signal scaling factor GF1. (Although a scaling factor is also known as gain, its value can be less than one.) As such, means 216 scales $V_{176}$ and $V_{178}$ differently with respect to each other, to accomplish a balancing calibration process that is described below.

Circuit 206 also includes a signal addition means 218. Means 218 adds the scaled first photocell signal with the second to produce a composite signal SB. The value of the composite signal is given by:

$$SB = GF1 * V_{176} + V_{178}$$

After the balancing calibration, composite signal SB is also called a balanced composite signal SB.

Circuit 206 further includes an output channel means 220. It is possible, with additional planning, to provide a lamp driver circuit with a transfer function that can be independently programmed to match the composite signal as soon as the balancing calibration process has been accomplished. In that case, signal addition means 218 is coupled directly to output channel means 220, and the composite signal is thus applied directly to the lamp driver as the control signal of the circuit.

In the general case, however, the lamp driver circuit is not provided with a transfer function that is programmable. Then circuit 206 preferably also includes a second signal scaling means 222. Means 222 multiplies balanced composite signal SB by a second scaling factor GF2, to produce a feedback signal FS1. The value of feedback signal FS1 is given by:

$$FS1 = GF2 * SB$$

Figure 9:
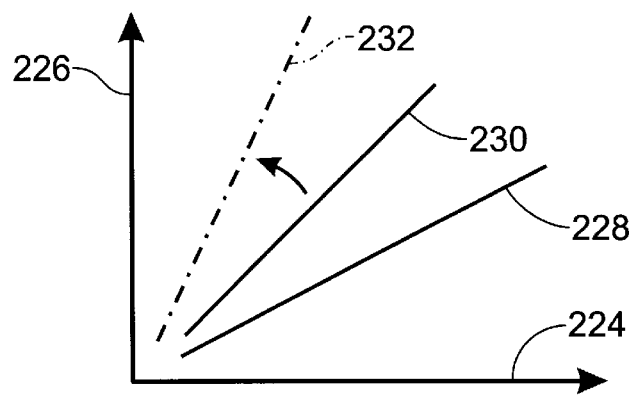
FIG. 9 is a diagram illustrating a matching calibration process for the circuit of FIG. 8.

The matching calibration process is now described with reference to FIG. 9. Horizontal axis 224 represents the illumination at the first location, while vertical axis 226 represents voltage, line 228 represents balanced composite signal SB generated in response to the illumination. Line 230 represents signal FS1 before matching. Dot-dashed line 232 represents the set point function that has been predetermined by the designer.

The matching calibration process adjusts scaling factor GF2. Seen graphically in FIG. 9, the adjustment rotates line 230 until it coincides with line 232. When this is accomplished, feedback signal FS1 will behave consistently with the designed set point function.

In addition, the signal formation circuit may include other elements, such as an intercept signal generation means (not shown in FIG. 8) for generating an intercept signal. The intercept signal would be added to the balanced composite signal during the matching calibration process, if a lateral offset were necessary for the matching of FIG. 9.

The second embodiment of the feedback signal formation circuit is now described with reference to FIG. 10. Feedback signal formation circuit 236 is adapted to form a feedback signal FS2 that decreases with illumination.

Figure 8:
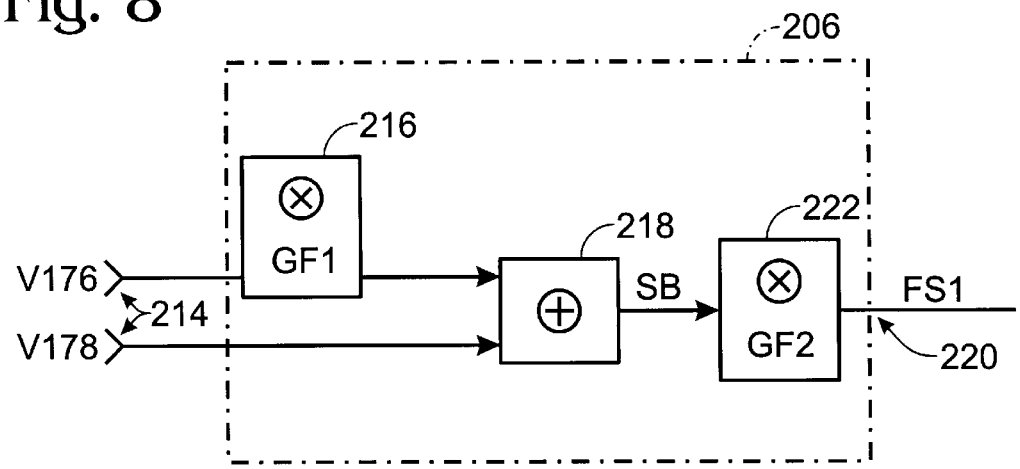
FIG. 8 is a block diagram illustrating the components of the feedback circuit of FIG. 7 according to a first embodiment of the invention.

Circuit 236 includes input channel means 214, first signal scaling means 216, signal addition means 218, and a second signal scaling means 222, all configured as was described in the first embodiment of FIG. 8. The value of intermediate signal C14 at the output of second signal scaling means 222 is given by:

$$C14 = GF2 * SB$$

In addition, circuit 236 includes an intercept signal generation means 240 that is also known as an intercept signal generator. Generator 240 generates an adjustable intercept signal IS. The value of signal IS is set during the matching calibration process via an input conductor (not shown in this figure) connected to the calibration circuit.

Circuit 236 also includes a signal subtraction means 242. Means 242 is capable of subtracting scaled composite signal C14 from intercept signal IS, to produce feedback signal FS2. The signal output from the subtraction means is also referred to as a difference signal. A well known way to implement a signal subtraction means is by using an inverter 244 in combination with another signal addition means 246, as is implemented in FIG. 10.

Circuit 236 further includes output channel means 220 that connects the signal subtraction means to the lamp driver circuit. The value of feedback signal FS2 is given by:

$$FS2 = IS - C14$$

Figure 11:
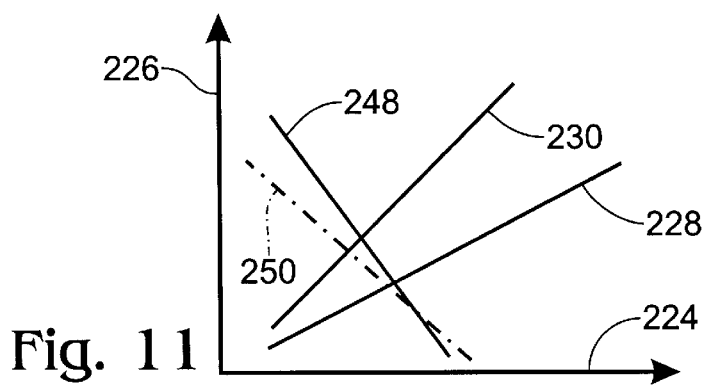
FIG. 11 is a diagram representing a matching calibration process for the circuit of FIG. 10.

The process of matching, described with reference to FIG. 11, is similar to the process described with reference to FIG. 9. Particularly, axes 224 and 226, and lines 228, 230 are the same as is shown in FIG. 9. In addition, line 248 represents feedback signal FS2 before matching. Dot-dashed line 250 represents a linear set point function that has a negative slope. Line 248 is made to match line 250 by adjusting intercept signal IS and scaling factor GF2.

A third embodiment of a feedback signal formation circuit is now described with reference to FIG. 12. Signal formation circuit 252 includes input channel means 214, first signal scaling means 216, second signal scaling means 222, signal addition means 218, and output channel means 220. These components are configured differently than in the first two embodiments. Accordingly, the value of feedback signal FS3 is given by:

$$FS3 GF1*V_{176} + GF2*V_{178}$$

Figure 13:
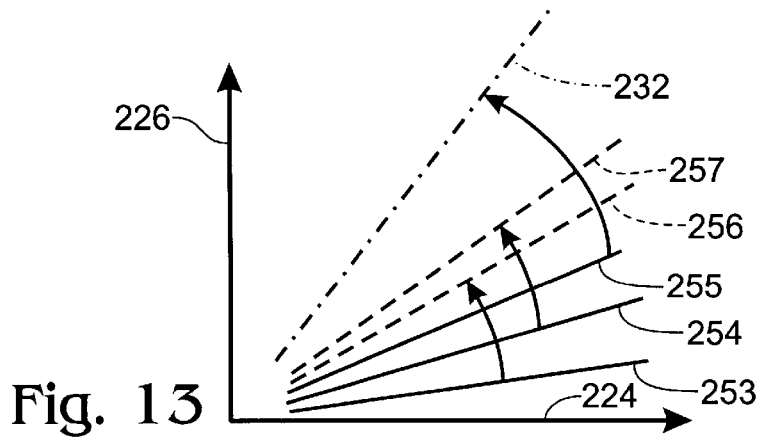
FIG. 13 is a diagram illustrating a calibration process for the circuit of FIG. 12.

The process for calibrating circuit 252 is illustrated in FIG. 13. Lines 253 and 254 respectively represent the unscaled sensor signals $V_{176}$ and $V_{178}$. Line 255 represents the unscaled composite signal formed by the addition of signals $V_{176}$ and $V_{178}$. During calibration, the two sensor signals are each scaled, producing scaled sensor signals 256 and 257. The scaling is adjusted to provide balance between the sensor signal contributions, and matching with the intercept signal, for producing a feedback signal FS3 that is consistent with the set-point transfer function represented by line 232 described previously.

Figure 12:
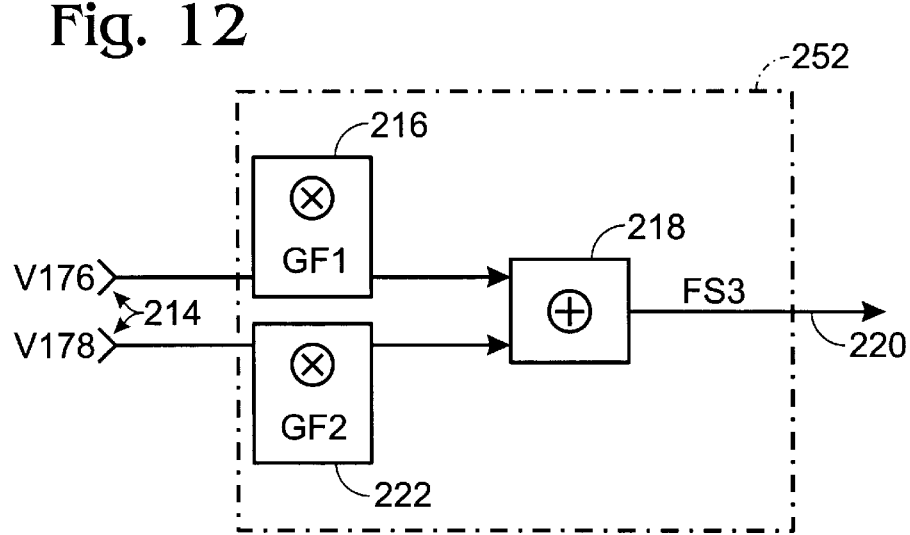
FIG. 12 is a block diagram illustrating the components of the feedback circuit of FIG. 7 according to a third embodiment of the invention.

It will be appreciated that scaling each input illumination signal prior to summing of the signals, as shown in the embodiment of FIG. 12, is equivalent to scaling only one input illumination signal, and then scaling the composite signal resulting from the addition of the scaled and unscaled illumination signals, as shown in the embodiment of FIG. 8. This is true so long as the two illumination signals are scaled by different scale factors. The amount that the individual scale factors are the same corresponds to a separate composite scale factor of the same amount as provided by scaling means 222 in the first embodiment. First and second scaling means 216 and 222 as shown in FIG. 12 thus provide both scaling of one illumination signal relative to the other, as well as scaling of both illumination signals.

Figure 14:
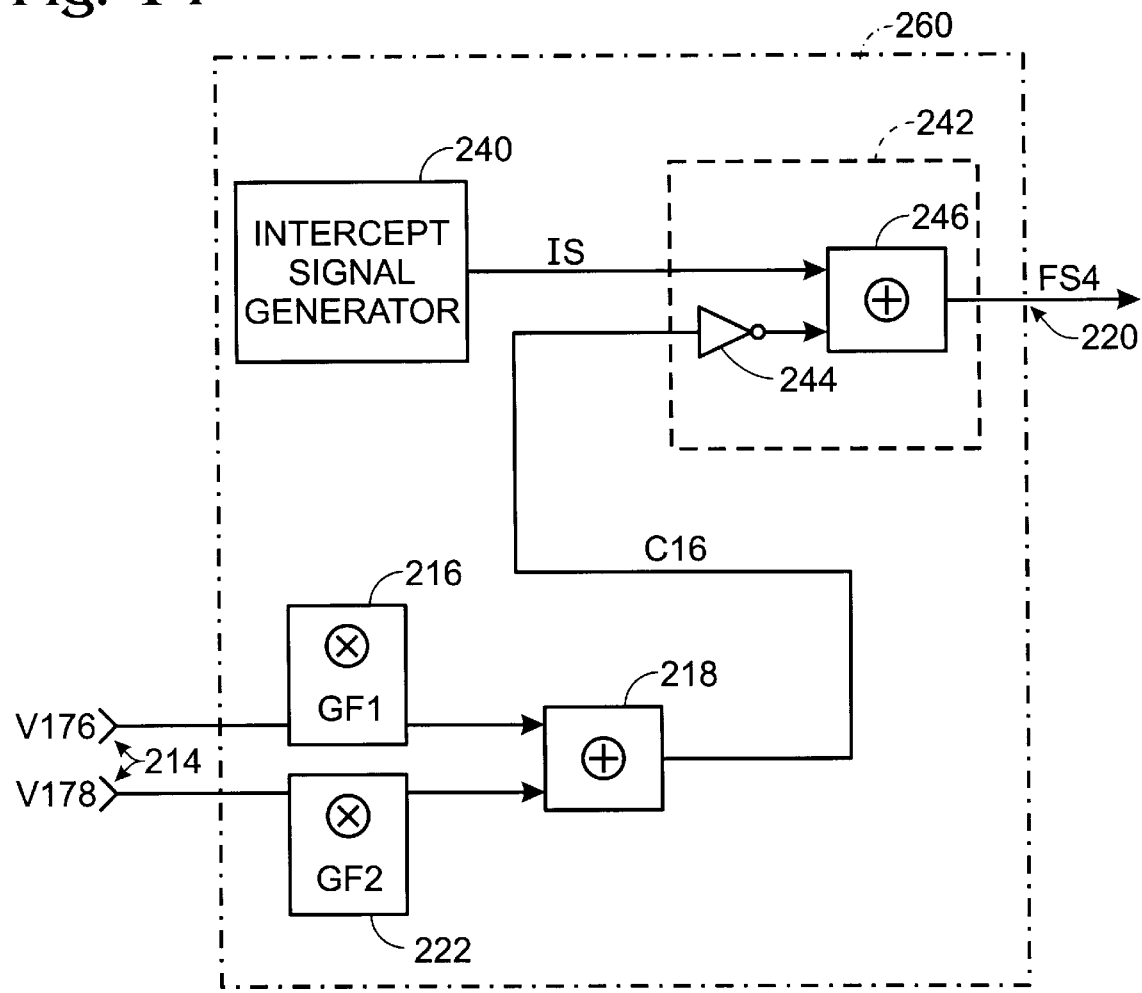
FIG. 14 is a block diagram illustrating the components of the feedback circuit according to a fourth embodiment of the invention.

The fourth embodiment of the invention is now shown with reference to FIG. 14. A signal formation circuit 260 includes input channel means 214, first and second scaling means 216 and 222, as in FIG. 12, and signal addition means 218.

In addition, circuit 260 includes intercept signal generator 240, and signal subtraction means 242. Means 242 is capable of subtracting intermediate composite signal C16 output from addition means 218 from the intercept signal IS, to produce a feedback signal FS4. Its value is given by:

$$FS4 = IS - C16$$

Since this equation is similar to the equation for feedback circuit 236, the fourth embodiment is suited for matching a set point function with a negative slope, such as line 250 in FIG. 11.

Figure 15:
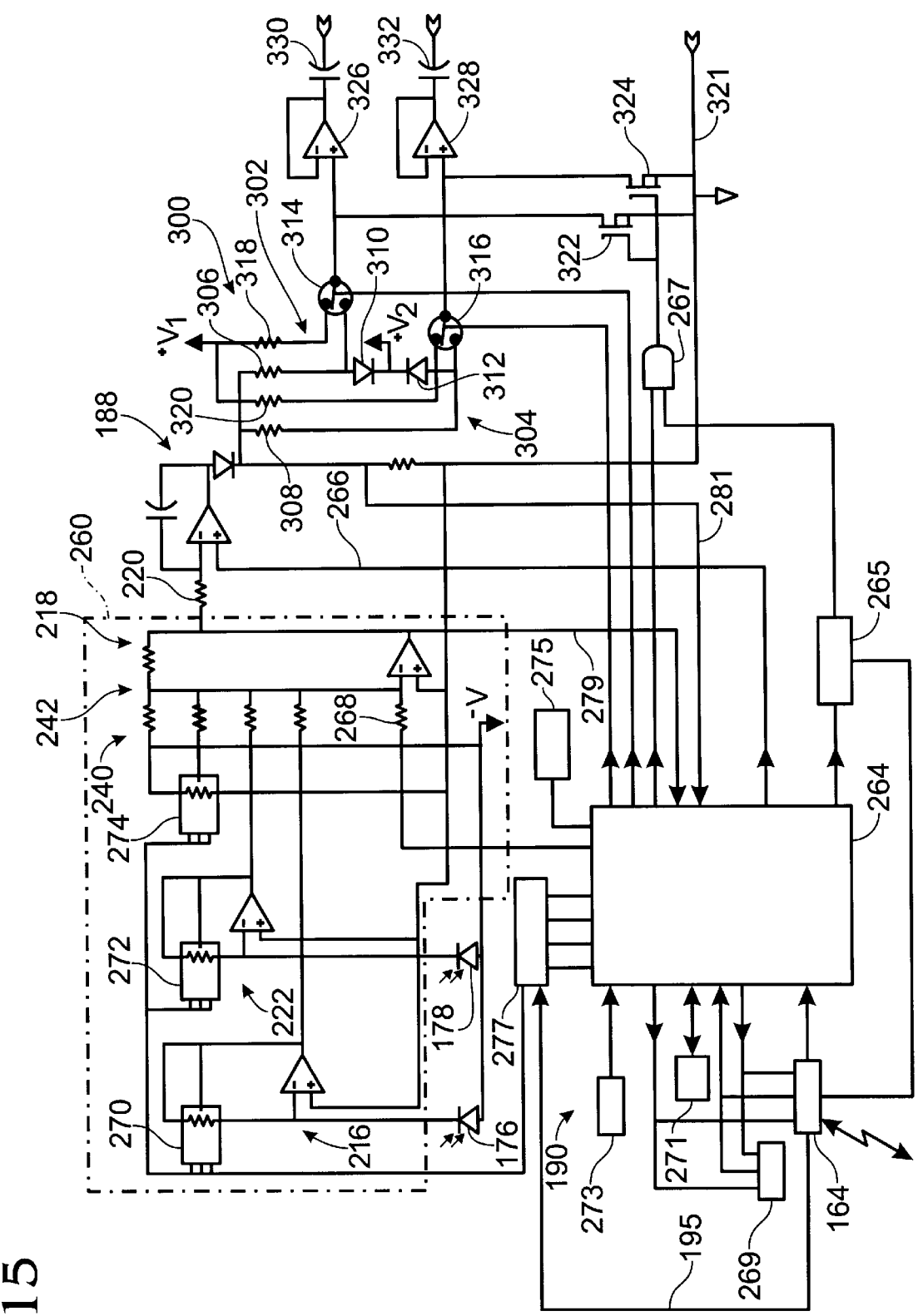
FIG. 15 is a schematic diagram for implementing the block diagram of FIG. 14.

The preferred circuitry of zone controller 160 is shown in the schematic of FIG. 15. Output means 220, shown as a resistor 220, is connected to error integrating amplifier 188. A microcontroller 264 generates on line 266 an analog signal for the set point voltage.

Microcontroller 264 also implements calibration circuit 190. The microcontroller includes an oscillator that outputs a signal with a fixed frequency to a frequency divider 265. One output of the frequency divider is applied to an AND gate 267, and another is applied to IR transceiver 164. An EMS interface 269 is connected to the microcontroller via conductors used in common with transceiver 164, as shown. A non-volatile random access memory (RAM) 271 stores data. An occupancy sensor 273 may provide control input. A zone controller address is stored in a register 275, and control outputs are provided via calibration enabling gating 277. Illumination and lamp current signals are input on conductors 279 and 281, respectively.

The two gain factors and the value of the intercept signal are adjusted by adjusting three non volatile electronically programmable potentiometers 270, 272, 274 in feedback signal formation circuit 260. In addition, a temporary offset, implemented by a voltage applied by microcontroller 264 to resistor 268, enables the preferred calibration method of the invention to be practiced in a much larger range of ambient illumination conditions. Microcontroller 264 and resistor 268 are also referred to as offset generation means.

In the embodiment of FIG. 15, the zone controller provides an AC voltage analog drive to the lamp drivers through the use of transformer coupling. The AC voltage is used to better enable galvanic isolation between the low voltage zone controller circuitry and the line voltage circuits used in the lamp drivers.

The DC analog signal, also referred to as a base control signal, at the output of the error amplifier 188 is fed through a diode/resistor network 300 to remove any chance of the signal having a negative value. The unipolarity signal is then split into two identical separate circuits 302, 304. Circuit 302 includes a resistor 306 and a maximum amplitude clamp diode 310, and circuit 304 includes a resistor 308 and clamp diode 312. Diodes 310, 312 are connected to a voltage $+V_2$. The signal from each circuit is applied to one input terminal of an associated ON/OFF (standby) selector switch 314, 316. The second input terminals of each switch is connected through resistors 318, 320 to a larger voltage $+V_1$, also referred to as a high signal. The outputs of switches 314, 316 are referred to respectively as first and second control signals.

Switches 314, 316 are driven by the microcontroller 264 to connect the outputs to the base control signal or the high voltage $+V_1$. This enables each output circuit to control the lamp drivers connected to it in response to the base control signal or to turn the lamps OFF. Also, clamping circuits could be used instead of switches 314, 316. In such a case the base control signal would be clamped during normal operation and unclamped when standby operation is desired.

The output terminals of each switch are selectively coupled to ground on line 321 by shunt switches 322, 324 which are used to convert the DC signal into a square wave AC signal. The signals are then buffered by amplifiers 326, 328. Series capacitors 330, 332 are included to remove the DC component from the signal.

During normal operation the transistor switches 322, 324, also referred to as third and fourth switches, are driven by a carrier frequency signal from the microcontroller system. During one step of the calibration process, the lamps can be turned ON at full uncontrolled power by removing the carrier frequency drives, i.e., by closing switches 322, 324. Accordingly, ground 321 is also referred to as a second source producing a full power signal having a level corresponding with full lamp power.

The two zone-controller output circuits allow slave lamp fixtures to be divided into two groups. A first group must be driven in unison with the master fixture, the second group can be turned OFF independently of the master and first group fixtures. This allows deep energy savings when illumination control is not vital, such as during night time security-only lighting. During normal use the EMS schedules the lighting levels and ON/OFF periods.

Balancing and matching are performed simultaneously in the circuits of FIGS. 12 and 14. The settings resulting from calibration are applicable not just for a single value of an illumination set point $I_{SP}$, but for an entire range of such values. Describing generally the calibration of the circuit of FIG. 14, a range of illumination levels is chosen by first defining a suitable minimum value $I_{MIN}$ and a suitable maximum value $I_{MAX}$. The value of $I_{MAX}$ should be small enough to be attainable even when the lamps have aged and are covered with dust. A typical range is between 20 fc and 50 fc.

Figure 16:
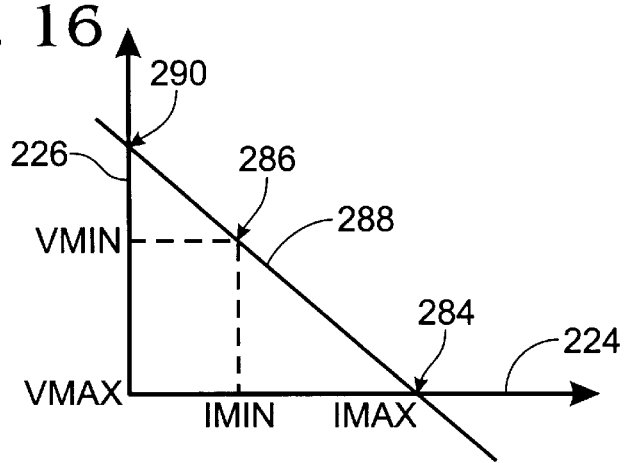
FIG. 16 is a diagram showing a preferred set point function according to the invention.

Then control signals are chosen that correspond to these illumination levels, so as to form a desirable set point function. For a typical +5 Volt microcontroller system, values may be $V_{MAX}=0$ Volt for producing $I_{MAX}$, and $V_{MIN}=2$ Volt for producing $I_{MIN}$. These values are illustrated in FIG. 16, where the axes are the same as in FIGS. 9, 11 and 13. Point 284 corresponds to $I_{MAX}$, and point 286 corresponds to $I_{MIN}$. A straight line 288, drawn through these points, represents the chosen set point function. Line 288 is analogous to line 250 of FIG. 11.

Line 288 intersects the vertical axis at point 290. This intercept value can be found from:

$$IS=I_{MAX}*(V_{MIN}-V_{MAX})/(I_{MAX}-I_{MIN})$$

For the values given above, this equation gives an IS of 3.33 V.

Line 288 will thus be definable for calculation purposes by its intercept 290 and its slope. Once they are known, the illumination set point $I_{SP}$ for the zone can be given any value in the range of $[I_{MIN}, I_{MAX}]$ by simply adjusting the set point voltage in the range of $[V_{MIN}, V_{MAX}]$. The control signal can also assume negative values, at least during the calibration process. In the end, however, the actual usable values are those in the segment between points 284 and 286.

Once chosen, these values are stored on a diskette. The lighting designer has the option to design the lighting plan in advance, in conjunction with the building's layout plan, and store all the information in the diskette. This minimizes the time and skill requirement of the field labor.

It is preferred but not essential that the calibration procedure is performed at a time when the ambient lighting is typical, i.e. not too early in the morning or too late at night. Additionally it is best if, at that time, the conditions in the zone are representative of typical use. The furniture should be in place, and there should be no extraneous objects nearby, such as ladders.

Calibration for the zone takes place with the equipment setup shown in FIG. 5. Calibration unit 168 is placed such that its photometer is underneath master fixture 154 for the illumination measurements. The key card (not shown) is inserted in the communication module 164. This enables communication between the communication module and the calibration unit 168.

The installer inserts the diskette in computer 170, and follows the instructions on the screen. Calibration is enabled with a few keystrokes. For the very short time it requires, the field engineer and all others in the area should avoid movement until the computer screen shows that the calibration has been completed. After the calibration is completed, the computer screen will also inform the installer where in the building is the next master fixture to go to, etc.

Specific calibration steps are now described for the various embodiments of the invention. As mentioned above, two calibration processes are provided, a balancing calibration and a matching calibration.

Prior to any automated calibration described hereunder, the illumination profile within the area comprising the zone may be adjusted by setting the lamp drivers to full, uncontrolled power and adjusting the relative gain of each lamp driver. Also, if at any time during the calibration described hereunder the feedback signal on output channel means 220 becomes less than zero, a temporary offset signal is applied by microcontroller 264 to resistor 268 to bring the feedback signal into the working range.

The calibration processes for the first general embodiment (seen in FIG. 8) and the second general embodiment (seen in FIG. 12), are similar. For the embodiment of FIG. 8 the scaling factors GF1 (balance) and GF2 (matching) have to be adjusted so that the signal FS1 has the same scaling relative to the desk top illumination irrespective of the source (day or controlled light flux) of the illumination. The scaling factor GF1 control has to be connected to the second photocell inside the fixture to be predominantly sensitive to controlled light flux.

Calibration is achieved by the following procedure:
1) the controlled lamps are turned OFF;
2) the (daylight) illumination at desk height is measured (in a reference location);
3) the variable scaling factor CF2 is adjusted to attain the desired signal level for feedback signal FS1;
4) the controlled lamps are turned ON;
5) the (total) illumination at the same reference location is measured;
6) the variable scaling factor GF1 is adjusted to re-attain the desired signal level for feedback signal FS1;
7) steps 1) through 6) are repeated until further adjustments are not required.

For the embodiment of FIG. 12 the scaling factors CF1 and GF2 are used to balance the signal proportions by differential adjustment, and, to match the signal level by common adjustment.

This is achieved by the following procedure:
1) the controlled lamps are turned OFF;
2) the (daylight) illumination at desk height is measured (in a reference location);
3) the variable scaling factors CF1 and CF2 are adjusted equal amounts to attain the desired signal level for feedback signal FS3;
4) the controlled lamps are turned ON;
5) the (total) illumination at the same reference location is measured;
6) the variable scaling factor GF1 is adjusted to re-attain the desired signal level for feedback signal FS3;
7) steps 1) through 6) are repeated until further adjustments are not required.

The two embodiments shown in FIGS. 8 and 12 generate feedback signals FS1 and FS3 that have positive gain and zero illumination origins equate to zero signal.

Figure 10:
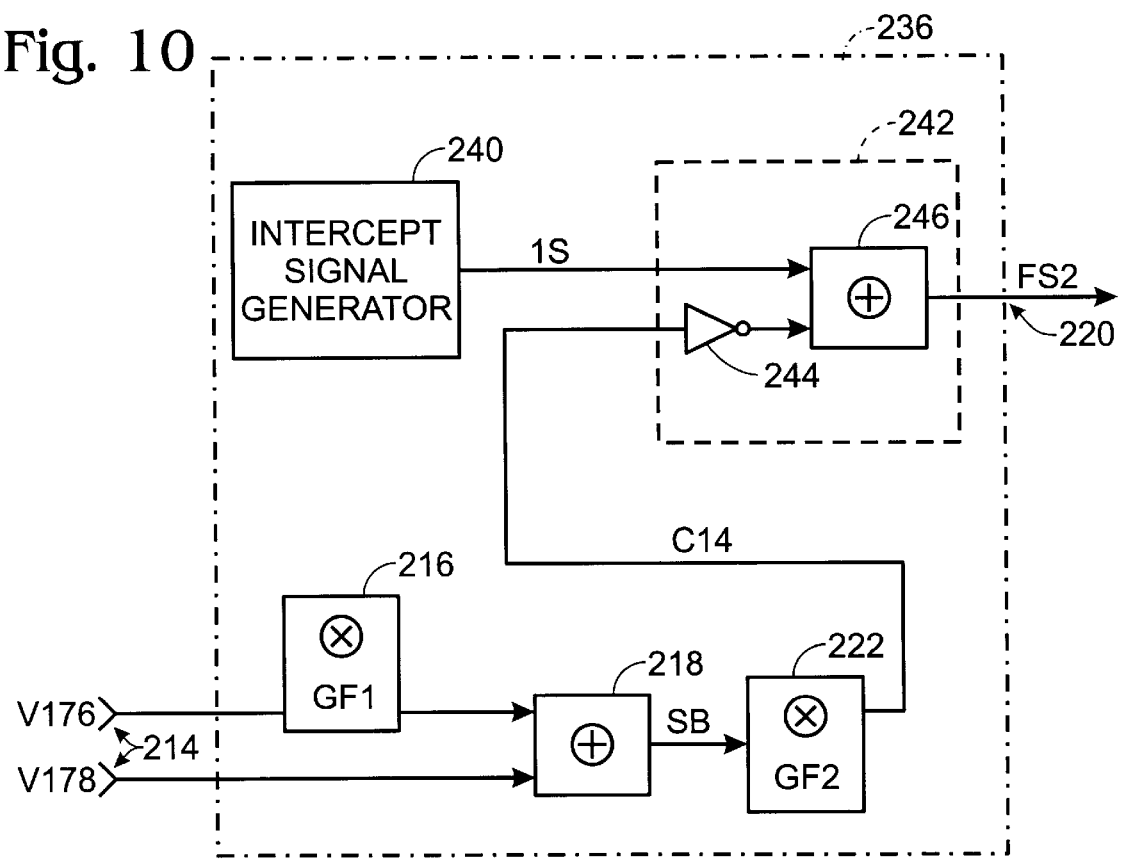
FIG. 10 is a block diagram illustrating the components of the feedback circuit according to a second embodiment of the invention.

If, for system convenience, it is desired to have negative gain and zero illumination equated to a positive signal, FIGS. 8 and 12 can be modified to the form shown in FIGS. 10 and 14.

The calibration procedure for the embodiment of the invention depicted by FIG. 10 becomes:
1) the controlled lamps are turned OFF;
2) the variable scaling factors GF1 and GF2 are both set to zero gain;
3) the intercept signal is set to attain the desired zero illumination signal level for feedback signal FS2;

4) the (daylight) illumination at desk height is measured (in a reference location);
5) the variable scaling factor GF2 is adjusted to attain the desired signal level for feedback signal FS2;
6) the controlled lamps are turned ON;
7) the (total) illumination at the same reference location is measured;
8) the variable scaling factor GF1 is adjusted to re-attain the desired signal level for feedback signal FS2;
9) the controlled lamps are turned OFF; and
10) steps 4) through 9) are repeated until further adjustments are not required.

The calibration procedure for the embodiment of the invention depicted by FIG. 14 becomes:
1) the controlled lamps are turned OFF;
2) the variable scaling factors GF1 and GF2 are both set to zero gain;
3) the intercept signal is set to attain the desired zero illumination signal level for feedback signal FS4;
4) the (daylight) illumination at desk height is measured (in a reference location);
5) the variable scaling factors CF1 and GF2 are adjusted equal amounts to attain the desired signal level for feedback signal FS4;
6) the controlled lamps are turned ON;
7) the (total) illumination at the same reference location is measured;
8) the variable scaling factor GF1 is adjusted to re-attain the desired signal level for feedback signal FS4;
9) the controlled lamps are turned OFF; and
10) steps 4) through 9) are repeated until further adjustments are not required.

The lighting control systems described have many advantages, including:

(a) the sensor locations are practical;
(b) all hardware can be fixture mounted and powered from normal fixture line power;
(c) no line power switching is required;
(d) all interconnect wiring can be low voltage telephone cable;
(e) EMS connections to zones can be bussed over standard data lines;
(f) master fixture drives to slave fixtures can be bussed over telephone cable;
(g) each zone operates as an isolated system without support from the EMS until the user wishes to update set points or default modes;
(h) being microcontroller based, a vast library of preset routines can be stored within the zone system for minimal EMS to zone traffic;
(I) installation and calibration can be computer based, removing the need for skilled labor;
(j) all installation and calibration base data can be supplied on a diskette from the system designer;
(k) calibration can be performed even if the zone illumination is higher than the maximum design illumination;
(l) calibration is completed very rapidly, thus avoiding problems that could otherwise be caused by daylight variations;
(m) being computer controlled, calibration is not subject to human error; and
(n) the latent energy management market is enabled by the availability of this technology, since the set point and default modes can be updated from the EMS either manually or by preloaded schedules.

In the above description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention.

What is claimed is:

1. A lighting control system for maintaining illumination at a selected level at a first location within a space that is illuminated by a first set of at least one lamp means the output of which is controlled by a first group of at least a first lamp driver that is responsive to a first control signal, the system comprising:

a first illumination sensor for generating a first illumination signal representative of the illumination at a second location within the space, the illumination at the second location including illumination produced by the lamp means;

a second illumination sensor for generating a second illumination signal representative of the illumination at a third location within the space, the third location being distinct from the second location;

a feedback circuit coupled to the first and second sensors for producing a feedback signal representative of the sum of the first and second illumination signals with the first illumination signal scaled relative to the second illumination signal;

a set point generator for generating a set point signal that corresponds to the selected illumination level; and error amplifier means responsive to the feedback signal and the set point signal for producing a base control signal appropriate for producing a lamp output that maintains the illumination at the selected level at the first location.

2. The system of claim 1, wherein the feedback circuit further produces the feedback signal to be representative of the sum of the first and second illumination signals with both the first and second illumination signals scaled.

3. The system of claim 2, wherein the feedback circuit further comprises intercept signal generation means for generating an intercept signal, and signal subtraction means for producing the feedback signal to be representative of the difference between the intercept signal and a composite signal representative of the sum of the scaled first and second illumination signals.

4. The system of claim 3, wherein the set point signal is adjustable and the system further comprises a first means coupled to the set point generator for automatically adjusting the set point signal.

5. The system of claim 4 further comprising a manually operable local controller coupled to the set point generator for manually adjusting the set point signal.

6. The system of claim 2, wherein the set point signal is adjustable and the system further comprises a first means coupled to the set point generator for automatically adjusting the set point signal.

7. The system of claim 6 further comprising a manually operable local controller coupled to the set point generator for manually adjusting the set point signal.

8. A system as in claim 3, 4 or 5 wherein the first illumination signal is scaled by a first gain factor, the second illumination signal is scaled by a second gain factor, and the system further comprises a third illumination sensor for generating a third illumination signal representative of the illumination at the first location and a calibration circuit responsive to the third illumination signal and coupled to the feedback circuit for setting the first and second gain factors and the intercept signal level.

9. The system of claim 8, further comprising offset generation means for biasing the feedback signal by a positive amount sufficient for preventing the feedback signal from becoming negative during adjustment of the first and second gain factors.

10. The system of claim 9, further comprising a memory associated with the calibration circuit, wherein the memory contains coded instructions suitable for the calibration circuit to execute a predefined calibration method for setting the first and second gain factors and the intercept signal level.

11. The system of claim 10, further comprising a first communication module coupled to the calibration circuit, a second communication module coupled to the third illumination sensor and to the first communication module for transmitting the third illumination signal to the first communication module.

12. The system of claim 11, wherein the calibration circuit is responsive to an enabling signal for enabling operation of the calibration circuit.

13. A system as in claim 2, 6 or 7 wherein the first illumination signal is scaled by a first gain factor, the second illumination signal is scaled by a second gain factor, and the system further comprises a third illumination sensor for generating a third illumination signal representative of the illumination at the first location and a calibration circuit responsive to the third illumination signal and coupled to the feedback circuit for setting the first and second gain factors.

14. The system of claim 13, further comprising offset generation means for biasing the feedback signal by a positive amount sufficient for preventing the feedback signal from becoming negative during adjustment of the first and second gain factors.

15. The system of claim 14, further comprising a memory associated with the calibration circuit, wherein the memory contains coded instructions suitable for the calibration circuit to execute a predefined calibration method for setting the first and second gain factors.

16. The system of claim 15, further comprising a first communication module coupled to the calibration circuit, a second communication module coupled to the third illumination sensor and to the first communication module for transmitting the third illumination signal to the first communication module.

17. The system of claim 16, wherein the calibration circuit is responsive to an enabling signal for enabling operation of the calibration circuit.

18. The system of claim 1, wherein the error amplifier means produces the base control signal to have a maximum value, the system further comprising a first source producing a high signal having a voltage greater than the maximum value of the base control signal and a first switch means coupled to the error amplifier means and the first source, the first switch means being operable for outputting, as a first control signal, either the base control signal or the high signal.

19. The system of claim 18 further operable for controlling a second set of at least a second lamp means, the output of which is controlled by a second group of at least a second lamp driver that is responsive to a second control signal, the system further comprising a second switch means also coupled to the error amplifier means and the first source, the second switch means being operable for outputting as a second control signal either the base control signal or the high signal.

20. The system of claim 19, further comprising a second source producing a low signal having a level corresponding to full lamp power, and third and fourth switch means coupling, respectively, the output of the first switch means and the output of the second switch means to the second source and operable for setting, respectively, the level of the first control signal and the level of the second control signal to the level of the low signal for controlling, respectively, the first and second groups of lamp drivers to fully power the associated lamp means.

21. The system of claim 18, further comprising a second source producing a low signal having a level corresponding to full lamp power, and a third switch means coupling the output of the first switch means to the second source and operable for setting the level of the first control signal to the level of the low signal for controlling the lamp drivers to fully power the lamp means.

22. A lighting control system for maintaining illumination at selected levels at a first location within a space that is illuminated by at least first and second groups of lamp means the outputs of which are controlled by associated lamp drivers that are responsive to respective first and second control signals, the system comprising:

a first illumination sensor for sampling the illumination at a second location within the space and generating a first illumination signal, the illumination at the second location including illumination produced by the lamp means;

a second illumination sensor for sampling the illumination at a third location within the space and generating a second illumination signal, the third location being distinct from the second location;

a feedback circuit comprising first signal scaling means for scaling the first illumination signal by a first gain factor, second signal scaling means for scaling the first and second illumination signals by a second gain factor, and signal addition means, the first and second signal scaling means and the signal addition means being adapted for producing a composite signal representative of the sum of the scaled first and second illumination signals, an intercept signal generation means for generating an intercept signal having a selected level, and signal subtraction means for producing a feedback signal representative of the difference between the composite signal and the intercept signal;

a third illumination sensor for generating a third illumination signal representative of the illumination at the first location;

a first communication module for transmitting a communication signal representative of the third illumination signal;

a calibration memory for storing coded instructions for setting the first and second gain factors and the intercept signal level;

a calibration circuit coupled to the calibration memory, the first and second scaling means, and the feedback circuit, and responsive to the communication signal representative of the third illumination signal for adjusting the first and second gain factors and the intercept signal level;

a second communication module coupled to the first communication module and the calibration circuit for transmitting the communication signal to the calibration circuit, and adapted to receive a key for enabling the calibration circuit to adjust the first and second gain factors and the intercept signal level;

offset generation means, responsive to the calibration circuit, for biasing the feedback signal by a positive amount sufficient for preventing the feedback signal from becoming negative during adjustment of the first and second gain factors;

a set point generator for generating a set point signal having a value that corresponds to the selected illumination level;

a manually operable local controller coupled to the set point generator for adjusting the set point signal value;

a remote controller coupled to the set point generator for transmitting a control signal to the set point generator for adjusting the set point signal value;

error amplifier means responsive to the feedback signal and the set point signal for producing a base control signal appropriate for producing lamp outputs that maintain the illumination at the selected level at the first location, the base control signal having a maximum value corresponding to a fully dimmed lamp means condition;

a first source producing a high signal having a value greater than the maximum value of the base control signal, the high signal value corresponding to a lamp means OFF condition;

first and second switch means each coupled to the error amplifier means and the first source, the first and second switch means being operable for outputting, as respective first and second control signals, either the base control signal or the high signal, for selectively turning the first and second groups of lamp means to OFF;

a second source producing a low signal having a level corresponding to full lamp means power;

third switch means coupling the output of the first switch means to the second source and operable for setting the level of the first control signal to the level of the low signal for controlling the lamp drivers to fully power the associated lamp means; and fourth switch means coupling the output of the second switch means to the second source and operable for setting the level of the second control signal to the level of the low signal for controlling the lamp drivers to fully power the associated lamp means.

* * * * *

UNITED STATES PATENT AND TRADEMARK OFFICE
CERTIFICATE OF CORRECTION

PATENT NO  : 6,025,679
DATED      : February 15, 2000
INVENTOR(S): Harper et al.

It is certified that error appears in the above-identified patent and that said Letters Patent is hereby corrected as shown below:

On the title page, second column, Attorney, Agent or Firm, Item 1, replace "George T. Kavounas" with --Gregory T. Kavounas--.

Signed and Sealed this

Twelfth Day of December, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO.   : 6,025,679
DATED        : February 15, 2000
INVENTOR(S)  : Harper et al.

It is certified that error appears in the above-identified patent and that said Letters Patent is hereby corrected as shown below:

Column 6,
Line 26, change "lamp" to -- Lamp --;

Column 8,
Line 23, change "voltage, line" to -- voltage. Line --;

Column 9,
Line 19, change "FS3GF1" to FS3 = GF1 --;

Column 12,
Line 44, change "CF1 and CF2" to -- GF1 and GF2 --;

Column 13,
Line 22, change "CF1" to -- GF1 --; and

Drawings,
Sheet 6, Fig. 10, change line label "1S" to -- IS --.

Signed and Sealed this

Ninth Day of October, 2001

Attest:

NICHOLAS P. GODICI
Attesting Officer     Acting Director of the United States Patent and Trademark Office